United States Patent Office 3,333,952
Patented Aug. 1, 1967

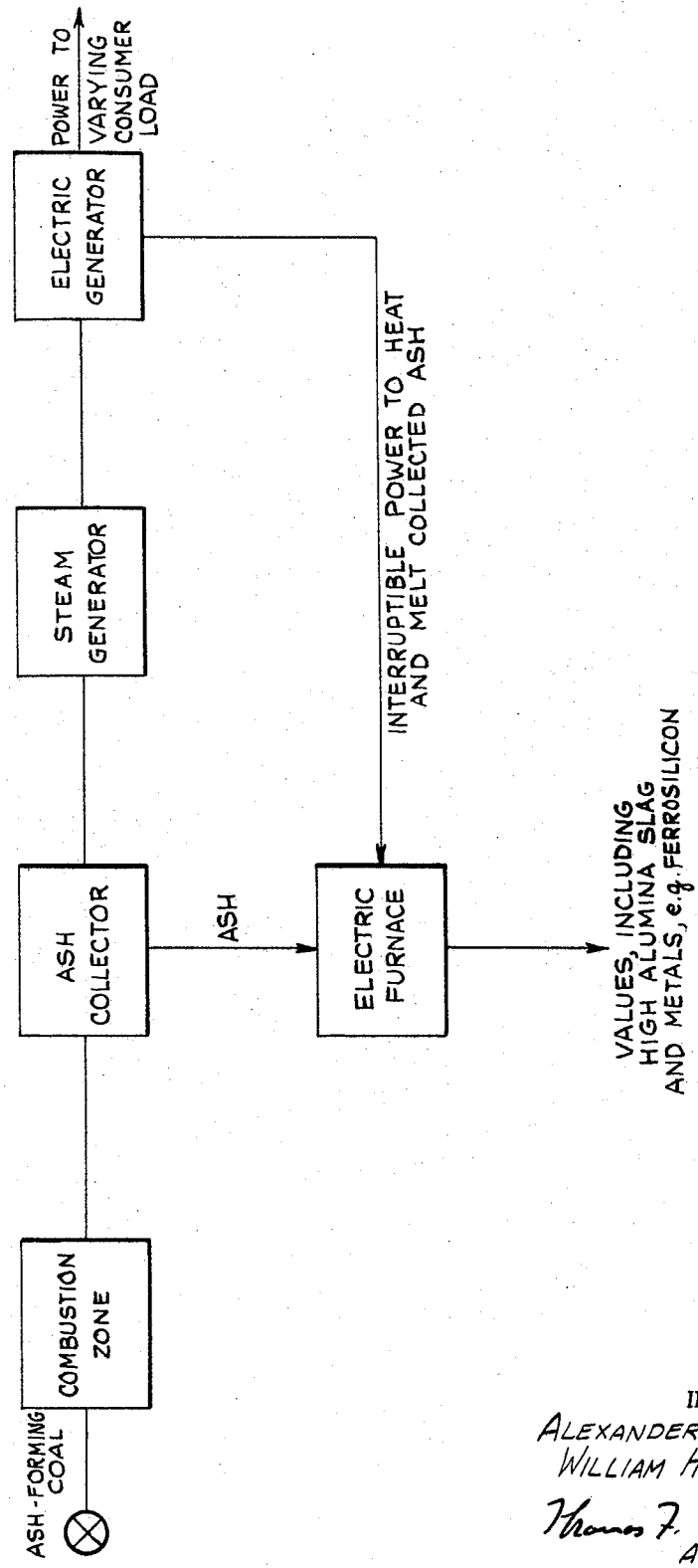

3,333,952
OPERATION OF A COAL-FIRED POWER PLANT
Alexander J. Tigges, New York, N.Y., and William H. Lambert, Johnstown, Pa., assignors to Pennsylvania Electric Company, Johnstown, Pa., a corporation of Pennsylvania
Filed Feb. 25, 1965, Ser. No. 435,222
5 Claims. (Cl. 75—11)

This invention relates to the operation of a power plant and the utilization of the generated electrical power. More particularly, this invention relates to the operation of a power plant which produces electrical power by operations involving the combustion of ash-forming or ash-producing coal.

In accordance with one embodiment this invention is directed to optimizing the operation of a coal-fired power plant. In accordance with another embodiment this invention is directed to the utilization and/or recovery of all values produced or generated in the operation of a coal-fired power plant. In accordance with yet another embodiment this invention is directed to the utilization of ash collected and recovered during the operation of a coal-fired power plant and to the generation and recovery of values, such as metal values, from the collected and recovered ash.

Thermal power plants of great capacity, so-called mine-mouth power plants, have been proposed and are being constructed. Some of these mine-mouth, thermal, coal-fired power plants being built are capable of burning or otherwise consuming many millions of tons, such as six millions of tons, of coal per year. In some instances the coal being consumed yields an amount of ash upwards of 10%, such as about 16%, by weight of the coal consumed.

In the past the ash collected during the operation of a coal-fired plant has been stored in open piles in areas adjacent the plant. The open storage of piles of ash has, however, in the past presented very many problems. It is therefore desirable that there be available means for disposing of the ash which is recovered during the operation of a coal-fired power plant rather than merely permitting the recovered ash to accumulate and be moved away from time to time.

Further, since coal ash contains potential metal values and is available in substantial amounts it is particularly desirable that a method or means be provided for the recovery of these values from the coal ash. Specifically, coal ash comprises predominantly iron oxide, silica and alumina. Additionally, coal ash comprises very minor amounts of calcium oxide, magnesium oxide and sodium and potassium oxides as well as materials containing the elements barium, manganese, phosphorus, strontium, titanium, tantalum and others. The presence of these materials, particularly the iron oxide and the alumina and the silica in the ash makes the coal ash a potentially valuable source of iron, ferrosilicon, alumina and the like.

Therefore, it is an object of this invention to provide an improved method of operating a coal-fired power plant, particularly a coal-fired power plant utilizing an ash-forming coal.

Another object of this invention is to provide a method of operating a power plant at a relatively high level of efficiency as measured by the production of power at a steady, relatively high level of power output.

Still another object of this invention is to provide a method of operating a coal-fired power plant involving the utilization of a portion of the generated electrical power for the recovery of values from the ash produced and recovered during the operation of the power plant.

Yet another object of this invention is to provide a method of disposing of the ash produced and collected during the operation of a coal-fired power plant.

How these and other objects of this invention are achieved will become apparent in the light of the accompanying disclosure made with reference to the accompanying drawing which schematically illustrates the practice of this invention as embodied in the operation of a power plant burning ash-forming or ash-producing coal. In at least one embodiment of the practice of this invention at least one of the foregoing objects will be achieved.

In accordance with this invention there is provided an improved method of operating and/or optimizing the operation of a coal-fired power plant. More particularly in accordance with this invention there is provided an improved method of operating a coal-fired power plant which consumes substantial amounts of ash-forming or ash-producing coal. Specifically, in accordance with this invention in the operation of a coal-fired ash-producing power plant the coal is consumed and steam is generated and supplied to an electric generator, such as a steam turbo-electric generator, under substantially steady state conditions of coal consumption, steam generation and electricity production. During the aforesaid operations the ash produced due to the combustion of the ash-forming coal is collected by suitable means, such as mechanical ash collectors and electrostatic precipitators. After collection the ash is supplied, preferably directly from the collectors and preferably while hot, in particle-form and/or in substantially molten form, directly to an electric furnace.

In the electric furnace the ash is heated, such as by resistance heating, employing a portion of the power generated by the power plant under conditions to effect fusion and melting of the ash. Desirably, the electric furnace is operated under temperature and reducing conditions to effect conversion of the metal values in the ash to the corresponding metals, particularly the conversion of the iron oxide content of the ash to ferrosilicon. Alumina and other values in the ash may be separately recovered in the form of a high alumina content slag.

The substantially steady state consumption of coal and generation of steam and electricity during the operation of the power plant and the consumption of the resulting produced electricity by distribution into an electrical consumer load network which exhibits a varying load demand and by utilization of a minor amount of the produced electrical power for the operation of the electric furnace is continued, preferably as long as the varying consumer load demand is at a relatively low level. When, however, the varying consumer load demand peaks or increases to a relatively high level the supply of electrical power for the operation of the electric furnace is interrupted and that minor amount of power previously directed to and consumed in the operation of the electric furnace is shunted or directed to the now increased consumer load demand.

It is thus seen that in the operation of a coal-fired power plant in accordance with this invention during normal or subnormal consumer electrical load conditions a portion, a very minor amount, about 5–8%, of the electricity produced during the operation of the power plant is consumed and utilized in the operation of an electric furnace to recover values from the ash produced and collected during the operation of the power plant. When, however, the electrical consumer load demand starts to peak or increases to a relatively high level, the electrical power previously directed to and consumed in the operation of the electric furnace is interrupted and diverted to satisfy the increased consumer electrical load demand. It is thus seen that by operating a coal-fired power plant in accordance with the practice of this invention the heretofore troublesome problem of ash disposal is advantageously overcome by the conversion of the ash to more readily handled denser materials and/or to substantially higher value materials, such as iron, ferrosilicon and high alumina content slag. Also the incremental capital investment cost which would have been required in the steam generating and electrical producing facilities of the power plant to provide capacity to handle that portion of the peak consumer load above normal load is eliminated since at least a portion of any incremental power necessary to supply or meet the increased varying load demands, such as the peak loads, is available by diverting electrical power from the operation of the electric furnace into the consumer load network during periods of peak load.

Since it is well known through actual operating experience when peak loads and subnormal consumer loads usually occur and since the interruption of power for the operation of an electric resistance furnace of the type which may be employed in accordance with the practice of this invention may be continued for a number of hours, it will readily be appreciated that the interruption of the power required to operate the electric furnace and the diversion of this power to the consumer load network during peak load periods can readily be planned for and accommodated in the operation of the electric furnace and the power plant without undue difficulty.

Referring now to the drawing which schematically illustrates the practice of this invention, ash-forming coal from a suitable source, such as a coal stock pile or directly from the mine, is supplied to a combustion zone, such as a fire box of a furnace. Therein the coal, preferably after pulverization, is burned to yield hot gaseous combustion products and ash. The ash is separated from the hot gaseous combustion products by means of suitable ash collectors which may comprise mechanical and/or electrostatic means for separating the ash from the hot gaseous combustion products.

The hot gaseous combustion products are employed to generate steam. The steam generation operation is usually carried out prior to the separation of the ash from the hot gaseous combustion products. The steam generated is then passed to a turbogenerator for the generation of electrical power which is then supplied to the consumer load network which exhibits a varying load demand depending upon the time of day. The collected ash is delivered directly to an electric furnace which is supplied with a portion of the power generated.

In the practice of this invention the coal is burned and steam generated and electricity produced at substantially constant rates. When the varying consumer load demand is at a normal or subnormal level, a portion of the produced power is employed to melt or otherwise convert or upgrade the ash supplied to the electric furnace into more readily handled and disposable materials and/or more valuable products, such as iron, ferrosilicon and/or high alumina slag. When, however, the consumer load demand peaks or increases to a relatively high level, above normal load level, the power previously delivered to the electric furnace is interrupted and diverted to the consumer load network and this diversion of the power to the consumer load network is continued for that period of time of higher than normal consumer load. When the consumer load returns to normal or subnormal levels a portion of the produced power is again employed to heat and melt the ash supplied to the electric furnace. It is thus seen that in periods of peak loads there is immediately available to the power station operator a source of additional power which can be immediately utilized on demand.

In the past to provide such a facility, i.e. a facility capable of producing or relasing power on demand during a period of peak load, it has been a practice to provide a so-called pumped storage facility in association with the power plant and operated in conjunction therewith. In a pumped storage facility, during periods of relatively low consumer demand and while maintaining the power output of the power station at a fairly constant level in excess of the demand, the excess power is employed to impart potential energy to a material, such as by pumping water to a suitably located reservoir. When peak demand periods are reached with the result that all power generated at the power station must be introduced into the consumer load network to meet the load demand, the potential energy previously imparted to the water on being pumped to the reservoir is recovered by permitting the water to flow through a suitably located hydroelectric generator which also may function as a pump during the periods of low load demand.

In accordance with one embodiment this invention is also adaptable for installation in combination with a pumped storage power plant and an associated coal-fired power plant. In such an installation during periods of nonpeak load a portion of the generated power may be employed to impart potential energy to water and at the same time to operate an electric furnace in the manner disclosed herein. Also, it may be desirable, depending upon the magnitude of the potential power available from the pumped storage reservoir, to divert a portion of the electrical output of the hydroelectric generator to the electric furnace so that in accordance with this special embodiment of the invention, if desired, the operation of the electric furnace can be maintained on a substantially continuous basis.

The following is illustrative of the advantages obtainable in the practice of this invention. Coal ash, such as flyask, analyzing

| Component: | Percent by weight |
| --- | --- |
| Carbonaceous or combustible matter | 2–16 |
| Silica ($SiO_2$) | 32–46 |
| Aluminum oxide ($Al_2O_3$) | 25–35 |
| Iron oxide ($Fe_2O_3$) | 8–30 |
| Calcium oxide (CaO) | 0.6–3.5 |
| Magnesium oxide (MgO) | 0.2–1.2 |
| Sodium and potassium oxides (by difference) | 0.8–4.0 | was charged to an electric furnace and heated to a temperature upwards of 2700° F., such as a temperature in the range 2900–3300° F., for a sufficient period of time to effect substantially complete fusion of the flyash charged to the furnace. Thereupon the furnace was tapped and there was discharged a ferrosilicon analyzing 10–40% silicon, the remainder being substantially only iron. There was also discharged from the furnace a slag analyzing 27–42% aluminum oxide and 25–35% silica.

By operating the electric furnace under reducing conditions such as by the addition thereto of carbon, e.g. anthracite coal, and by operating the furnace at a relatively high temperature upwards of 3000° F. it is possible to produce as product ferrosilicon metal analyzing in the range 40–50% by weight silicon and higher, as well as a high alumina slag, such as an alumina slag analyzing upwards of 30% by weight alumina, e.g. 35–50% alumina. Also, it is possible to operate the electric furnace in accordance with this invention under even more severe reducing and temperature conditions so as to convert substantially all of the metal values in the ash charged thereto to the corresponding metals, e.g. iron, aluminum and silicon as ferrosilicon. Further, if desired, the electric furnace may be operated under relatively mild conditions sufficient to effect fusion of the ash charged thereto and conversion of the ash to a more readily handled and stored, more dense vitreous material such as a material suitable as a road surfacing agent or aggregate.

As will be apparent to those skilled in the art in the light of the foregoing disclosure, many modification, substitutions and alterations are possible in the practice of this invention without departing from the spirit or scope thereof.

We claim:
1. A method which comprises burning ash-forming coal at a substantially constant rate to yield hot gaseous combustion products and ash material, employing the hot gase- ous combustion products to generate steam at a substantially constant rate, employing the thus-generated steam to drive a turbo-generator for the production of electrical power for distribution into an electrical load network which exhibits a varying load demand, said electrical power being generated at a substantially constant level of power output, recovering said ash material, subjecting the recovered ash material to heating and melting by utilizing a minor portion in the range about 5–8% of the generated electrical power to accomplish the heating and melting of the ash material when the varying load demand is at a relatively low level and interrupting the heating and melting of said ash material when the varying load demand of said load network reaches a relatively high level and directing that amount of power previously employed for the heating and melting of said ash material into said load network.

2. A method in accordance with claim 1 wherein the heating and melting of the recovered ash material is carried out in the presence of added carbonaceous material.

3. A method in accordance with claim 1 wherein the heating and melting of the ash material is carried out under conditions to effect conversion of a substantial amount of the metalliferous materials present in said ash material to metal.

4. A method which comprises burning ash-forming coal at a substantially constant rate to yield hot gaseous combustion products and solid ash material, said solid ash material comprising carbonaceous material, iron oxide, silica and aluminum oxide, employing the hot gaseous combustion products to generate steam at a substantially constant rate, employing the thus-generated steam to drive a turbo-generator for the production of electrical power for distribution into an electrical load network which exhibits a varying load demand, said electrical power being generated at a substantially constant level of power output, recovering said solid ash material, subjecting the recovered solid ash material to resistance melting in an electrical furnace by utilizing a minor portion in the range about 5–8% of the generated electrical power to accomplish the melting of said solid ash material when the varying load demand is at a relatively low level and interrupting the melting of said solid ash material when the varying load demand of said load network reaches a relatively high level and directing that amount of power previously employed for the heating and melting of said ash material into said load network.

5. A method in accordance with claim 4 wherein the resistance melting of said solid ash material is carried out under conditions to effect substantially complete conversion of the iron oxide and silica content of the solid ash material to ferrosilicon.

References Cited
UNITED STATES PATENTS

| | | | |
|---|---|---|---|
| 2,242,675 | 5/1941 | Janssen | 75—25 |
| 2,274,414 | 2/1942 | James | 110—65 |
| 3,015,553 | 2/1962 | Johnson | 75—24 |
| 3,126,274 | 3/1964 | Aamot | 75—24 |
| 3,133,804 | 5/1964 | Hardgrove | 110—65 |
| 3,175,900 | 3/1965 | Johnson | 75—11 |

FOREIGN PATENTS
674,884  11/1963  Canada.

DAVID L. RECK, *Primary Examiner.*

H. SAITO, *Assistant Examiner.*